US012741567B2

(12) United States Patent
Lin et al.

(10) Patent No.: US 12,741,567 B2
(45) Date of Patent: Sep. 22, 2026

(54) SYSTEM FOR IMPLEMENTING CONTINUOUS CO-PHASE FLEXIBLE ALTERNATING CURRENT TRACTION POWER SUPPLY AND OPERATION MODE THEREFOR

(71) Applicants: CHINA RAILWAY ELECTRIFICATION BUREAU GROUP CO., LTD., Beijing (CN); TSINGHUA UNIVERSITY, Beijing (CN); CHINA RAILWAY ELECTRICAL INDUSTRY CO., LTD., Baoding (CN)

(72) Inventors: Yunzhi Lin, Beijing (CN); Yingdong Wei, Beijing (CN); Xiaoqian Li, Beijing (CN); Yinjun Zhao, Beijing (CN); Zhanhe Li, Beijing (CN); Zengqin Li, Baoding (CN); Chao Lu, Beijing (CN); Hongzhi Huang, Baoding (CN); Ziming Li, Beijing (CN); Mingrui Li, Beijing (CN)

(73) Assignees: CHINA RAILWAY ELECTRIFICATION BUREAU GROUP CO., LTD., Beijing (CN); TSINGHUA UNIVERSITY, Beijing (CN); CHINA RAILWAY ELECTRICAL INDUSTRY CO., LTD., Baoding (CN)

( * ) Notice: Subject to any disclaimer, the term of this patent is extended or adjusted under 35 U.S.C. 154(b) by 735 days.

(21) Appl. No.: 18/245,038

(22) PCT Filed: Mar. 18, 2022

(86) PCT No.: PCT/CN2022/081813
§ 371 (c)(1),
(2) Date: Mar. 13, 2023

(87) PCT Pub. No.: WO2022/194292
PCT Pub. Date: Sep. 22, 2022

(65) Prior Publication Data
US 2023/0356629 A1 Nov. 9, 2023

(30) Foreign Application Priority Data
Mar. 18, 2021 (CN) ......................... 202110293124.3

(51) Int. Cl.
*B60M 3/04* (2006.01)

(52) U.S. Cl.
CPC .................................... *B60M 3/04* (2013.01)

(58) Field of Classification Search
CPC . B60M 3/00; B60M 3/02; B60M 3/04; B60M 3/06
See application file for complete search history.

(56) References Cited

FOREIGN PATENT DOCUMENTS

CN 103241138 8/2013
CN 108859872 A * 11/2018 ............. B60M 3/00
(Continued)

OTHER PUBLICATIONS

CNIPA, First Office Action for CN Application No. 202110293124.3, Jul. 22, 2023.

(Continued)

*Primary Examiner* — Robert J McCarry, Jr.
(74) *Attorney, Agent, or Firm* — Hodgson Russ LLP

(57) ABSTRACT

A system for implementing continuous co-phase flexible alternating current traction power supply and an operation mode therefor includes at least one flexible traction substation and neutral sections. Each flexible traction substation includes a first power inlet line and a second power inlet line, each of which is coupled to one end of a corresponding (Continued)

breaker, the other end of the corresponding breaker is coupled to a primary side of one traction transformer, and a secondary side of the traction transformer is coupled to a plurality of SPCs. SPCs corresponding to each set of traction transformer are coupled in parallel and coupled to a bus of the flexible traction substation through breakers. One feeder line is provided between the bus of the flexible traction substation and each of an up-track line and a down-track line of an overhead contact system, and each feeder line is provided with one up-to-net breaker thereon.

20 Claims, 12 Drawing Sheets

(56) References Cited

FOREIGN PATENT DOCUMENTS

| | | | |
|---|---|---|---|
| CN | 111446866 | 7/2020 | |
| CN | 111446867 | 7/2020 | |
| CN | 111890998 A * | 11/2020 | ................ H02J 3/26 |

OTHER PUBLICATIONS

WIPO, International Search Report for PCT/CN2022/081813, Jun. 22, 2022.

* cited by examiner

SYSTEM FOR IMPLEMENTING CONTINUOUS CO-PHASE FLEXIBLE ALTERNATING CURRENT TRACTION POWER SUPPLY AND OPERATION MODE THEREFOR

CROSS-REFERENCE TO RELATED APPLICATIONS

This application is a U.S. national phase application of International Application No. PCT/CN2022/081813, filed on Mar. 18, 2022, which claims priority to Chinese Patent Application No. 202110293124.3, filed on Mar. 18, 2021, the entire disclosures of which are incorporated herein by reference.

TECHNICAL FIELD

The present disclosure relates to a field of electrical engineering of rail transportation technologies, and more particularly to, main wiring and an operation mode of a system for implementing continuous co-phase flexible alternating current traction power supply.

BACKGROUND

In related arts, (1) a technical solution of prior art 1 provides a method of continuous co-phase traction power supply based on a single-phase transformer and a single-phase to single-phase power electronic converter.

For example, there is provided a continuous co-phase traction power supply system, a traction substation and a power supply control method thereof, which provides a traction substation including a plurality of electric energy conversion devices. The electric energy conversion device includes a single-phase transformer and an electric energy converter. A high-voltage winding of each single-phase transformer is respectively connected with two different phase wires in a preset power network, a low-voltage winding of each single-phase transformer is connected with a port at an input side of the corresponding electric energy converter, and a port at an output side of each electric energy converter is respectively connected with a preset overhead contact system and a preset steel rail.

(2) A technical solution of prior art 2 provides a method of continuous co-phase traction power supply based on a multilevel three-phase to single-phase power electronic converter.

For example, there is provided a fully-connected alternating-current traction power supply system, which includes a plurality of substations. The substations include a plurality of co-phase power supply devices, left power supply arms, power supply neutral sections and right power supply arms, and the power supply arms of the adjacent substations are communicated with each other. Input ends of the co-phase power supply devices are connected with a power supply grid, and output ends of the co-phase power supply devices are connected to a bus of a traction electric network. The co-phase power supply devices are configured to convert three-phase alternating current power from the power supply grid into single-phase alternating current power with a specific voltage and output the single-phase alternating current power to the bus of the traction electric network, and power of the co-phase power supply devices is distributed and controlled according to a specific rule. The left power supply arms and the power supply neutral sections are disconnected through parallel lines, and the power supply neutral sections and the right power supply arms are disconnected through parallel lines. The left power supply arms, the power supply neutral sections and the right power supply arms are respectively connected with the bus of the traction electric network.

(3) A technical solution of prior art 3 provides a method of continuous co-phase traction power supply based on a multilevel three-phase to single-phase power electronic converter.

For example, there is provided a continuous type traction power supply system based on multilevel converters connected in parallel, which is formed by connecting a plurality of continuous traction power supply substations in parallel and establishing networks. Traction networks of every two adjacent substations are directly connected, so that a continuous traction power supply network is formed. Each continuous traction power supply substation is composed of an input step-down transformer which is connected to a three-phase power grid, one or more multilevel three-phase alternating current-direct current-alternating current converters which are connected in parallel and are connected with an output end of the input step-down transformer and an output boosting transformer connected with the converters and the traction network.

The related arts have the following disadvantages.

(1) For the technical solution of prior art 1, it is necessary to ensure that power outputs of the electric energy conversion device at respective phase sequences are completely the same in order to reduce negative sequence current introduced by the traction substation in the system. In case of fault of some electric energy conversion devices, the traction substation will inject a large amount of negative sequence current into the power system. Since there is no electric section on the overhead contact system, an influence range of a power-down switch changing operation cannot be reduced through the electric section when a fault occurs on the overhead contact system.

(2) For the technical solution of prior art 2, six feeder lines and six circuit breakers are required between the bus of the traction substation and the overhead contact system, and the neutral section structure is required to arrange, which may have complex main wiring and high cost.

(3) For the technical solution of prior art 3, there is no electrical section on the overhead contact system. When a fault occurs on the overhead contact system, it is impossible to achieve fault isolation within a small power supply range, which may lead to power failure of the whole overhead contact system and decrease of power supply reliability of the whole system.

Most of the existing continuous co-phase traction power supply system solutions focus on a research of converter topology, wirings of the overhead contact system and other key elements, but a research on main wiring and an operation mode of the whole power supply system is not sufficient.

SUMMARY

An embodiment of the present disclosure provides a system for implementing continuous co-phase flexible alternating current traction power supply. The system includes:

- at least one flexible traction substation and electric sections;
- each flexible traction substation comprises a first power inlet line and a second power inlet line, each of which is coupled to one end of a corresponding power inlet line breaker, the other end of the corresponding power inlet line breaker is coupled to a primary side of one set of traction transformer, and a secondary side of the traction transformer is coupled to a plurality of static power converters (SPCs), wherein the SPCs corresponding to each set of traction transformer are coupled in parallel with each other to convert three-phase alternating current into single-phase alternating current and are respectively coupled to a bus of the flexible traction substation through outlet line breakers;

one feeder line is provided between the bus of the flexible traction substation and each of an up-track line and a down-track line of an overhead contact system, and each feeder line is provided with one up-to-net breaker thereon;

the up-track line and the down-track line of the overhead contact system are respectively provided with the electric sections therein, and each of the electric sections is coupled in parallel with one breaker which is turned on in a normal operation mode;

a configuration manner of the electric sections comprises arranging one section post between every two adjacent flexible traction substations, and arranging the electric sections inside the section post; or arranging the electric sections inside the flexible traction substation without arranging any section post, and arranging the electric sections on a same side of two feeder lines between the bus of the flexible traction substation and the overhead contact system, or respectively on both sides of the two feeder lines, or between the two feeder lines;

in which, a number of the electric sections between any two flexible traction substations is determined according to a target project.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which:

FIG. 1 (*b*) illustrates a continuous co-phase power supply mode.

FIG. 7(*b*) illustrates a parallel operation mode for two groups of traction transformers.

DETAILED DESCRIPTION

Figure 1:
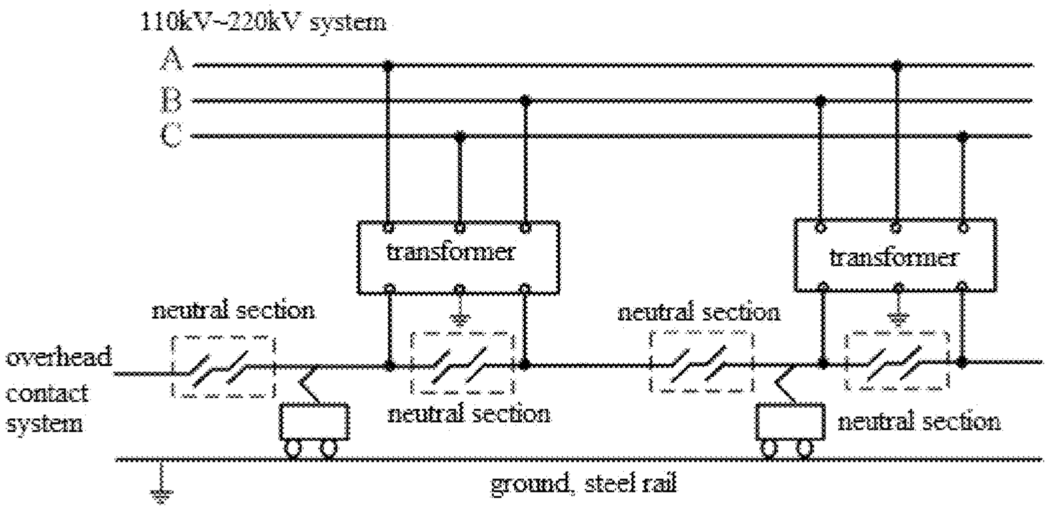
FIGS. 1 (*a*) and 1 (*b*) are schematic diagrams illustrating a traction power supply system, where FIG. 1 (*a*) illustrates a traditional out-of-phase power supply mode.
Figure 1:
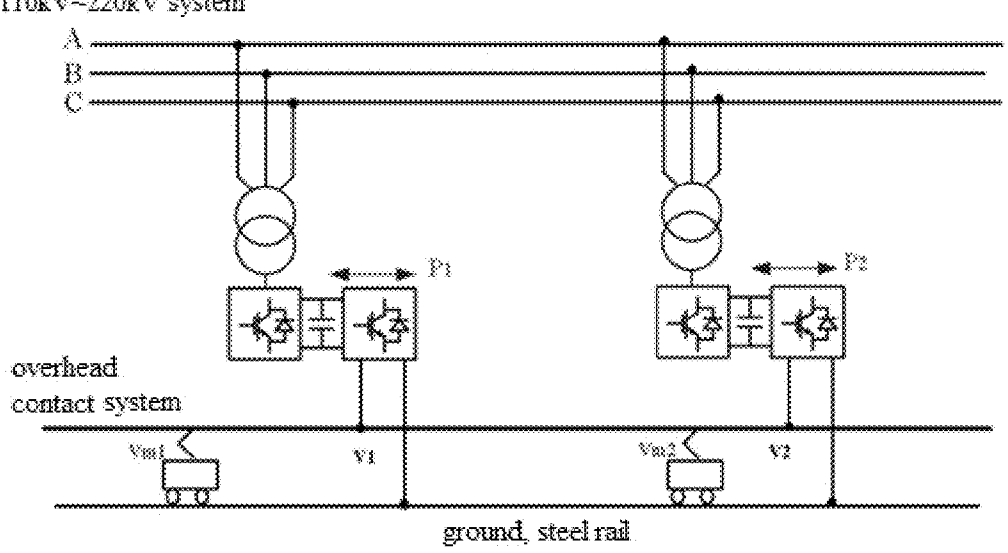

Reference will be made in detail to embodiments of the present disclosure. Examples of the embodiments of the present disclosure will be shown in drawings, in which the same or similar elements and the elements having same or similar functions are denoted by like reference numerals throughout the descriptions. The embodiments described herein according to drawings are explanatory and illustrative, not construed to limit the present disclosure.

The present disclosure is made based on understanding and discovery of Applicants for the following problems.

Since a structure of neutral section exists in an out-of-phase power supply mode, development of traction power supply technologies of electrified railway in China has been restricted for a long time by a problem of locomotives passing over the neutral section of and a power quality problem mainly based on negative sequence. The continuous co-phase power supply technology has advantages of completely cancelling the neutral section, significantly improving the power quality, changing unilateral power supply to bilateral power supply, further absorbing regenerative braking energy of the locomotives, improving fault ride-through capability of the power grid, improving fault adaptability of the system, introducing intelligent system-level control, and providing support for Internet construction of the future rail transit energy, which is a development trend in the future.

At present, research results related to the continuous co-phase power supply mode mainly focus on topology and control of power electronics. A practical application of the continuous co-phase power supply mode will involve design and selection of main wiring and an operation mode of a continuous co-phase traction power supply system. Therefore, it is necessary to study the main wiring and the operation mode of the continuous co-phase traction power supply system. Before introducing a system for implementing continuous co-phase flexible alternating current traction power supply proposed in an embodiment of the present disclosure, brief introduction is made below on a traction power supply system.

A traction power supply system is as illustrated in FIG. 1, which mainly includes two parts of a traction transformer and an overhead contact system. The traction transformer is powered by a 110 kV or 220 kV public power grid, which converts high-voltage power in a power transmission network into AC (alternating current) power with a lower voltage level, or supplies low-voltage AC power to a power electronic device, to be further converted into low-voltage DC (direct current) power and then supplied to the overhead contact system. The overhead contact system acts as a power transmission line. An electric locomotive introduces electric energy into the locomotive through a pantograph or other means for operation of a motor on the locomotive.

In particular, a neutral section structure is described in FIG. 1 (*a*). The neutral section includes a switch acted as insulation, which is used to separate power supply sections with different voltage phases. Since 25 kV/50 Hz single-phase AC power has been established as a standard power supply type for electrified railway in China, all loads of the electrified railway are single-phase loads. In order to avoid three-phase imbalance resulted by a large number of single-phase loads, a method of "exchange phase connection" is adopted. For example, one section of power supply zone uses A-phase power, then the next section of power supply zone uses B-phase power, and a section of power supply zone after next uses C-phase power, cycled as such, which is the method of "exchange phase connection". Since a difference of voltage phases between two adjacent power supply zones is 120° or 60°, it is necessary to set the neutral section structure to separate different power supply zones in order to avoid electromagnetic loop network of the traction system. Although the neutral section plays a role in separating the power supply zones and controlling the three-phase imbalance, the neutral section is a main source of faults of the traction power supply system, which may cause problems such as reduction of speed of high-speed railway and "break-down" of a heavy-duty locomotive.

Although China's electrified railway technology has been relatively advanced, a key technology in the power supply field—continuous co-phase power supply technology—has yet to be broken through. In the field of electrified railway technology, how to solve a problem of neutral section is a core problem. The continuous co-phase power supply technology is a key method to solve the above problem, as illustrated in FIG. 1 (*b*).

A continuous co-phase traction power supply system is a combination of a flexible AC transmission power system and a traction power supply system. The continuous co-phase traction power supply system converts three-phase power of 110 kV/220 kV public power grid into 27.5 kv/50 hz single-phase AC power through an electronic power convertor like a SPC composed of fully-controlled elements. Since an amplitude and a phase of an output voltage of the electronic power convertor are controllable, a phase of a voltage of the overhead contact system may be controlled to a certain reference value, and an amplitude of the voltage may be controlled to a rated value of 27.5 kV. Thus, the neutral section structure may be eliminated, and full connection of the overhead contact system may be realized. To a great extent, deficiency and shortage of the out-of-phase power supply mode that has troubled China's traction power supply technology for decades can be solved.

Therefore, the present disclosure provides a system for implementing continuous co-phase flexible alternating current traction power supply, with better economy, strong reliability and flexibility, and well applicability and practicability. The system includes at least one least one flexible traction substation and electric sections.

Each flexible traction substation includes a first power inlet line and a second power inlet line, and each of which is coupled to one end of a corresponding power inlet line breaker, the other end of the corresponding power inlet line breaker is coupled to a primary side of one set of traction transformer, and a secondary side of the traction transformer is coupled to a plurality of static power converters (SPCs). The SPCs corresponding to each set of traction transformer are coupled in parallel with each other to convert three-phase alternating current (AC) into single-phase AC and are respectively coupled to a bus of the flexible traction substation through outlet line breakers.

One feeder line is provided between the bus of the flexible traction substation and each of an up-track line and a down-track line of an overhead contact system, and each feeder line is provided with one up-to-net breaker thereon.

The up-track line and the down-track line of the overhead contact system are respectively provided with the electric sections therein. Each electric section is coupled in parallel with one breaker which is turned on in a normal operation mode.

A configuration manner of the electric sections includes arranging one section post between every two adjacent flexible traction substations, and arranging the electric sections inside the section post; or arranging the electric sections inside the flexible traction substation without arranging any section post, wherein, the electric sections are arranged on a same side of two feeder lines between the bus of the flexible traction substation and the overhead contact system, or respectively on both sides of the two feeder lines, or between the two feeder lines.

Each flexible traction substation includes the plurality of SPCs. Each of the SPCs is configured with two input ports, and the two input ports are respectively couple to secondary sides of two sets of traction transformers in the flexible traction substation. Each of the SPCs has two output ports, and one of the two output ports is grounded, and the other one of the two output ports is coupled in parallel with one another and is coupled to the bus of the flexible traction substation. A grounding mode of the traction transformers is determined according to the SPCs.

In an embodiment of the present disclosure, two sets of traction transformers in any one flexible traction substation are in an active and standby operation mode or a parallel operation mode. In the active and standby operation mode, all of the SPCs are coupled to one set of traction transformer. In the parallel operation mode, the two sets of traction transformers operate simultaneously, and the SPCs are coupled to the two sets of traction transformers.

In an embodiment of the present disclosure, each flexible traction substation is configured with two up-to-net breakers, and the two up-to-net breakers are respectively coupled the bus of the flexible traction substation with the up-track line and the down-track line of the overhead contact system. The up-track line and the down-track line of the overhead contact system are respectively provided with the electric sections therein. Each electric section is coupled in parallel with one breaker which is turned on in a normal operation mode.

In an embodiment of the present disclosure, in case of a fault of one up-to-net breaker, an isolation switch coupled across the up-to-net breakers is turned on, and a single feeder line supplies power to the up-track line and the down-track line at the same time.

A system for implementing continuous co-phase flexible alternating current traction power supply according to an embodiment of the present disclosure will be described below with reference to the drawings.

FIG. 2 to FIG. 5 are schematic diagrams illustrating a system structure of a system for implementing continuous co-phase flexible alternating current traction power supply according to embodiments of the present disclosure. Specifically, as illustrated in FIG. 2 to FIG. 5, the system for implementing continuous co-phase flexible alternating current traction power supply includes N flexible traction substations and M pairs of electric sections, and satisfies that n≥1 and m≥1. Each flexible traction substation is coupled to an external power supply through two power inlet lines, and respectively coupled to an up-track line and a down-track line of an overhead contact system through two feeder lines. There are a total of 2 M electric sections on the up-track line and the down-track line of the overhead contact system, and each of the up-track line and the down-track line is provided with M electric sections. Specifically, there are many ways to set the electric sections. A section post between flexible traction substations may be specially arranged, and the electric sections may be arranged inside the section post. Alternatively, the electric sections may be arranged on a same side of two feeder lines between the flexible traction substation bus and the overhead contact system, or respectively on both sides of the two feeder lines, or between the two feeder lines, in the flexible traction substation.

Figure 2:
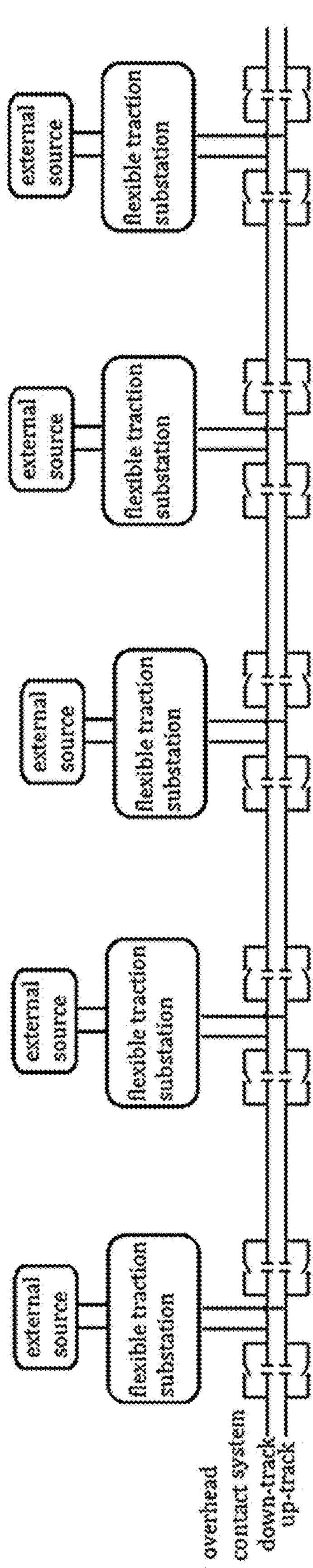
FIG. 2 is a schematic diagram illustrating a structure of a system where electrical sections are located on both sides of two feeder lines of a flexible traction substation according to an embodiment of the present disclosure.

FIG. 2 is a schematic diagram illustrating a system structure of a system for implementing continuous co-phase flexible alternating current traction power supply according to an embodiment of the present disclosure. Specifically, as illustrated in FIG. 2, there is no special section post, and the electric sections are respectively located on both sides of the two feeder lines of the flexible traction substation. When the foregoing electric section arrangement solution is adopted for the whole system, M=2N.

Figure 3:
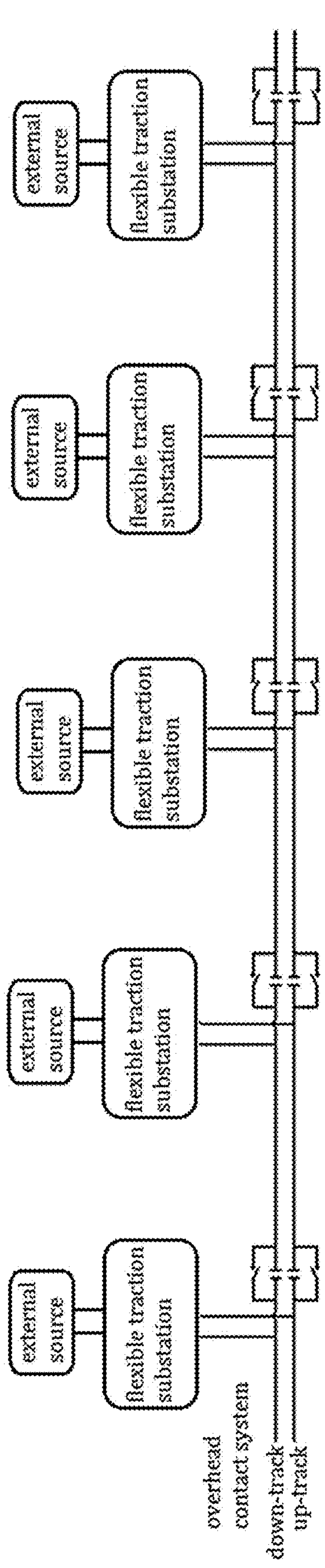
FIG. 3 is a schematic diagram illustrating a structure of a system where an electrical section is located on one side of two feeder lines of a flexible traction substation according to an embodiment of the present disclosure.

FIG. 3 is a schematic diagram illustrating a system structure of a system for implementing continuous co-phase flexible alternating current traction power supply according to an embodiment of the present disclosure. Specifically, as illustrated in FIG. 3, there is no special section post, and the electric sections are located on the same side of the two feeder lines of the flexible traction substation. When the foregoing electric section arrangement solution is adopted for the whole system, M=N.

Figure 4:
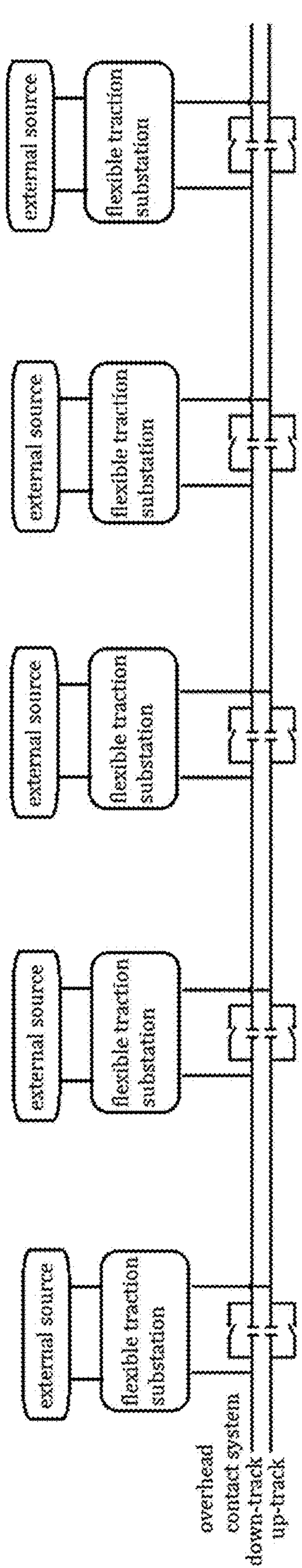
FIG. 4 is a schematic diagram illustrating a structure of a system where an electrical section is located between two feeder lines of a flexible traction substation according to an embodiment of the present disclosure.

FIG. 4 is a schematic diagram illustrating a system structure of a system for implementing continuous co-phase flexible alternating current traction power supply according to an embodiment of the present disclosure. Specifically, as illustrated in FIG. 4, there is no special section post, and the electric sections are located on between the two feeder lines of the flexible traction substation. When the foregoing electric section arrangement solution is adopted for the whole system, M=N.

Figure 5:
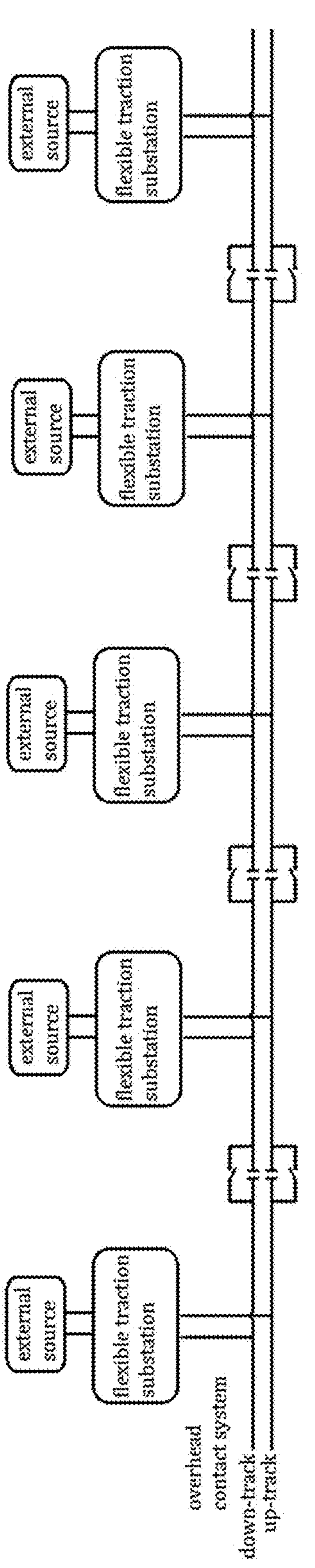
FIG. 5 is a schematic diagram illustrating a structure of a system where an electrical section is located in a section post according to an embodiment of the present disclosure.

FIG. 5 is a schematic diagram illustrating a system structure of a system for implementing continuous co-phase flexible alternating current traction power supply according to an embodiment of the present disclosure. Specifically, as illustrated in FIG. 5, the section post is arranged between the flexible traction substations, and the electric sections are located inside the section post. When the foregoing electric section arrangement solution is adopted for the whole system, M=N.

It can be understood that the above embodiments are illustrative and cannot be understood as limitations of the present disclosure. Those skilled in the art may adopt various the foregoing electric section arrangement solutions of the above embodiments in one traction power supply system within the scope of the present disclosure. For the sake of economy, those skilled in the art may, within the scope of the present disclosure, omit part of the electric sections on the basis of the above embodiments, to reduce the number of electric sections.

Further, in an embodiment of the present disclosure, a number of the electric sections between any two flexible traction substations is determined according to a target project.

Specifically, there may be more than one electric sections between two flexible traction substations, and there may be only one electric section between a plurality of flexible traction substations. The number of the electric sections may be determined by weighing reliability and economic requirements of the main wiring of the system according to an actual engineering condition.

Figure 6:
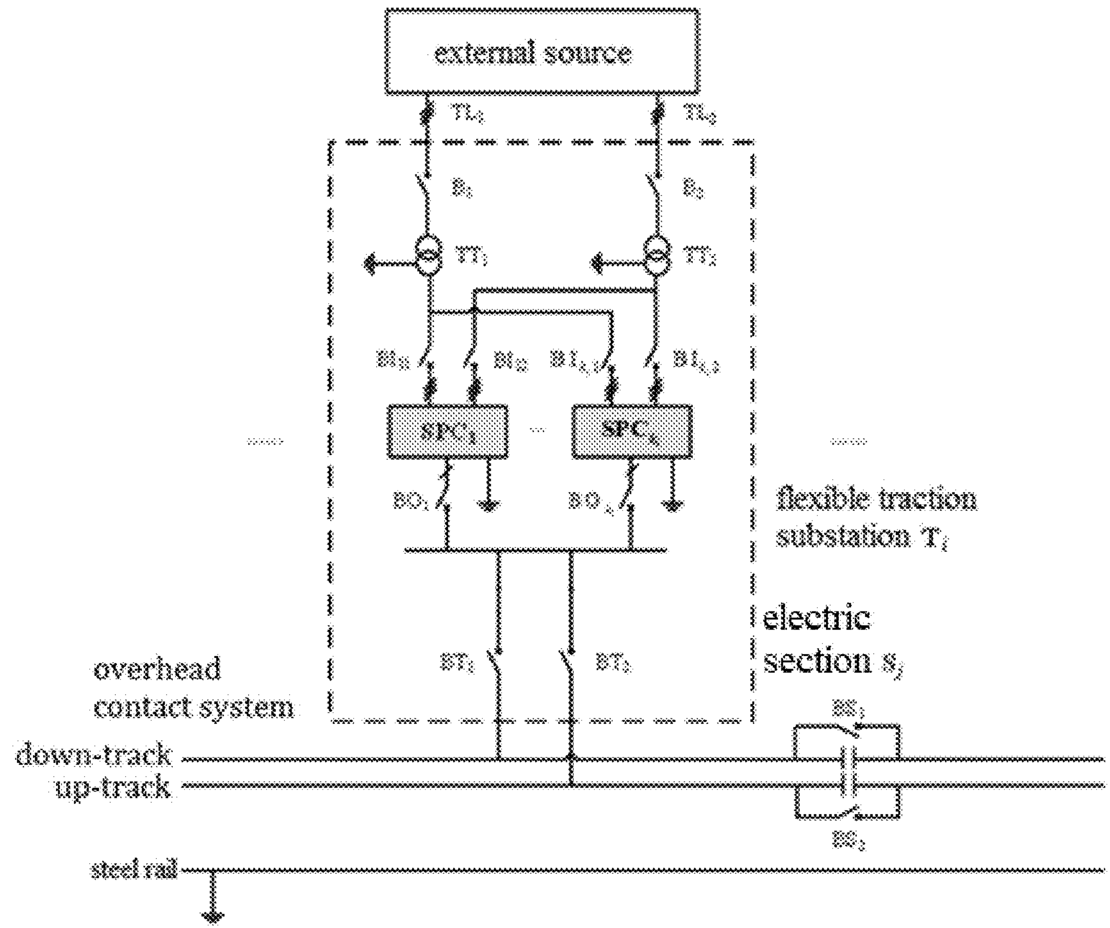
FIG. 6 is a schematic diagram illustrating main wiring of a system of continuous co-phase traction power supply.

FIG. 6 is a block diagram illustrating a system for implementing continuous co-phase flexible alternating current traction power supply according to an embodiment of the present disclosure. Specifically, FIG. 6 illustrates a schematic diagram of main wiring by taking the i-th (1≤i≤n) flexible traction substation $T_i$ and the j-th pair (1≤J≤m) of electric sections $S_j$ as an example. The i-th flexible traction substation $T_i$ includes two three-phase power inlet lines $TL_1$ and $TL_2$ whose voltage level may be a level of 220 kV, 110 KV, 35 kV or 10 kV, but not limited to the above voltage levels, a first set of traction transformers $TT_1$ and a second set of traction transformers $TT_2$, each of which has x (x≥1) traction transformers running in parallel, $k_i$ ($k_i$≥1) SPC equipment $SPC_1, \ldots, SPC_{k_i}$, power inlet-line breakers $B_1$ and $B_2$, and up-to-net breakers $BT_1$ and $BT_2$. It should be noted that for different flexible traction substations, values of $k_i$ are not necessarily the same, that is, different flexible traction substations may be set with different numbers of the SPCs.

The three-phase power inlet lines $TL_1$ and $TL_2$ are respectively coupled to one ends of the power inlet-line breakers $B_1$ and $B_2$, and the other ends of the power inlet-line breakers $B_1$ and $B_2$ are respectively coupled to ports at primary sides of two sets of traction transformers $TT_1$ and $TT_2$. Each SPC equipment includes two three-phase input ports and two single-phase output ports. A port at a secondary side of the traction transformer $TT_1$ is coupled to one three-phase input port of each of $SPC_1, \ldots, SPC_{k_i}$ through each of $k_i$ inlet line breakers, $B_{11}, \ldots, B_{k,1}$, correspondingly, and a port at a secondary side of the traction transformer $TT_2$ is coupled to the other three-phase input port of each of $SPC_1, \ldots, SPC_{k_i}$ through each of $k_i$ inlet line breakers, $B_{12}, \ldots, BI_{k,2}$, correspondingly. One single-phase output port of each of $SPC_1, \ldots, SPC_{k_i}$ is coupled to a bus in the flexible traction substation $T_i$, and the other single-phase output port of each of $SPC_1, \ldots, SPC_{k_i}$ is grounded. A grounding mode of the traction transformers may be determined according to an actual situation and demand of the SPCs.

As illustrated in FIG. 6, the flexible traction substation $T_i$ is coupled to an up-track line of an overhead contact system through one feeder line, and to a down-track line of the overhead contact system through one feeder line. Each feeder line is provided with up-to-net breakers $BT_1$ and $BT_2$ thereon.

Further, in an embodiment of the present disclosure, the electric sections in the up-track line and the down-track line of the overhead contact system are coupled in parallel with the breakers respectively, and the breakers are turned on in a normal operation mode.

It can be understood that, for the electric section Sj (1≤j≤m) as illustrated in FIG. 6, the electric sections in the up-track line and the down-track line of the overhead contact system are bypassed by the breakers $BS_2$ and $BS_1$, respectively. The breakers $BS_2$ and $BS_1$ are turned on in the normal operation mode.

It should be noted that under a traditional out-of-phase power supply mode, a wiring form of the traction transformer in the traction power supply system is very complex and special, such as, SCOTT wiring, Woodbridge wiring, impedance balance wiring and other balanced wiring forms, YNd11, Vv and other wiring forms. In the continuous co-phase traction power supply system, since the SPC may convert three-phase AC to single-phase AC without power quality problem, the traction transformer in the traction power supply system may no longer use the complex wiring form of the traction transformer, but may use a common transformer with better economy and more mature technology.

In an embodiment of the present disclosure, in response to a fault of one power inlet line or one traction transformer, a breaker on the fault power inlet line or breakers on inlet and outlet lines of the fault traction transformer is turned off, and all non-fault SPCs may continue to operate through a non-fault power inlet line and a non-fault traction transformer.

In an embodiment of the present disclosure, in response to a fault of any SPC, the fault SPC is out of operation, and breakers on inlet and outlet lines of the fault SPC are turned off.

In an embodiment of the present disclosure, in response to a fault of two power inlet lines or two traction transformers or the bus of the flexible traction substation, the flexible traction substation is out of operation, and other non-fault flexible traction substations supply power to the overhead contact system.

In an embodiment of the present disclosure, in response to a fault of one breaker in parallel with the electric section, an isolation switch in parallel with the electric section is turned on to supply power to two sections of lines coupled through the electric section.

Figure 7:
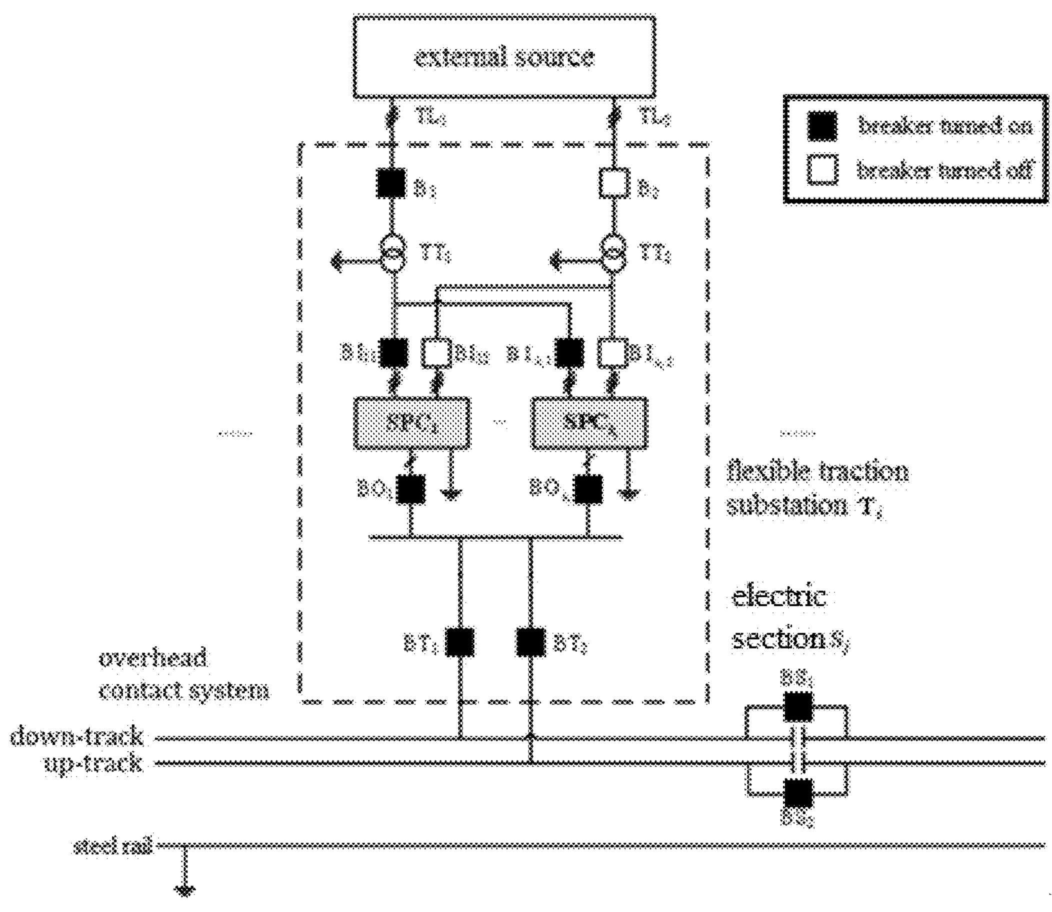
FIGS. 7 (*a*) and 7(*b*) are schematic diagrams illustrating an operation mode under a normal condition according to an embodiment of the present disclosure, where FIG. 7 (*a*) illustrates an active and standby operation mode for two groups of traction transformers.
Figure 7:
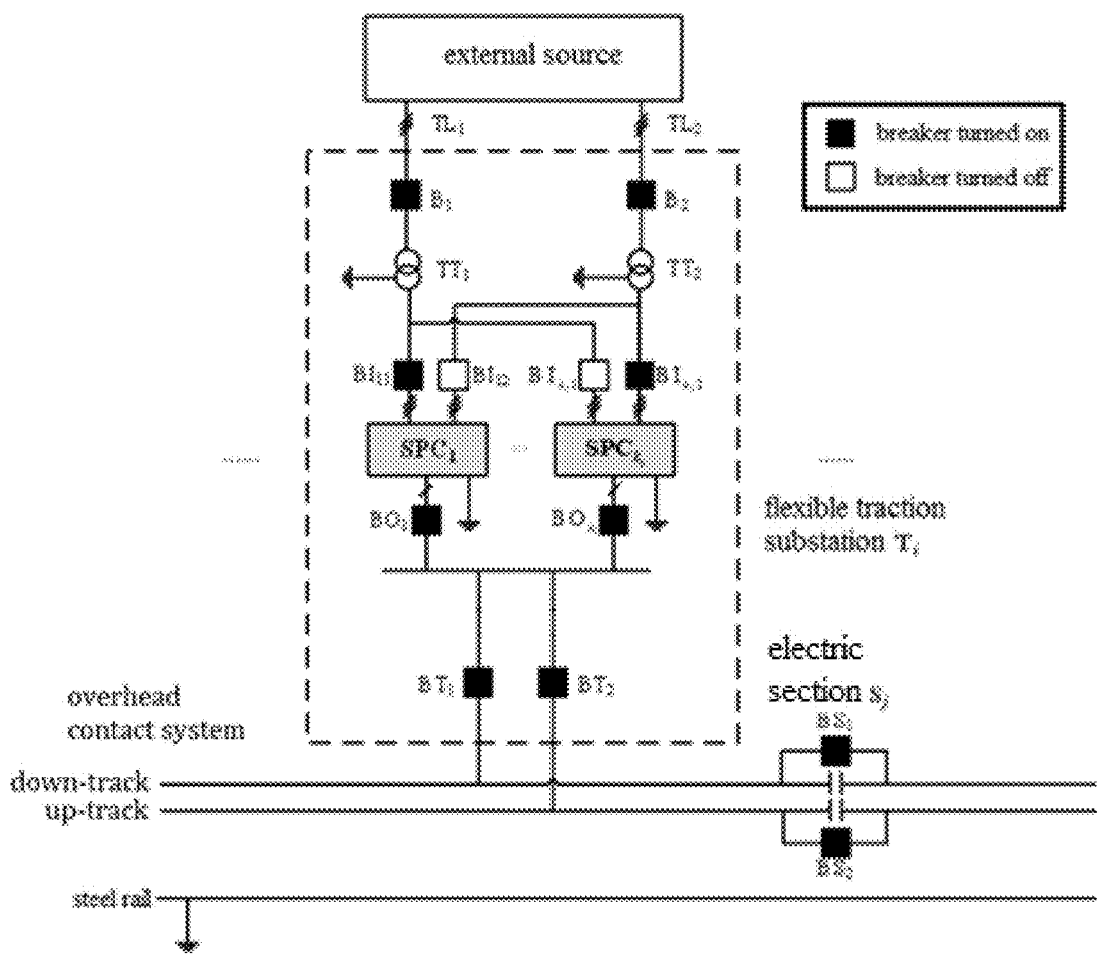

It should be noted that under normal operation, a breaker of a electric section is turned on, and co-phase continuous for the whole line of the overhead contact system is implemented, as illustrated in FIG. 7. Further, in an embodiment of the present disclosure, two sets of traction transformers in any flexible traction substation are in an active and standby operation mode or a parallel operation mode. In the active and standby operation mode, all of the SPCs are coupled to one set of traction transformer, as illustrated in FIG. 7 (*a*). In parallel operation mode, the two sets of traction transformers operate simultaneously, and the SPCs are coupled to two sets of traction transformers, as illustrated in FIG. 7 (*b*).

Specifically, two sets of traction transformers in one flexible traction substation may be in the active and standby operation mode or the parallel operation mode. In the active and standby operation mode, all of the SPCs are coupled to one set of traction transformer. In case of a fault of this set of traction transformer or an inlet line of a power system of this set of traction transformer, another set of standby traction transformer supplies power. In the parallel operation mode, two sets of traction transformers operate simultaneously, and the SPCs are coupled to two sets of traction transformers. In case of a fault of one set of traction transformer or an inlet line of a power system of the set of traction transformer, power outputs of respective flexible traction substations may be coordinated through system-level control, such that a flexible traction substation operated normally may support a flexible traction substation with fault traction transformer. Traction transformers operating in parallel may have advantages of making full use of a capacity of each traction transformer, reducing a standby capacity of each traction transformer, and improving economy of the system.

Figure 8:
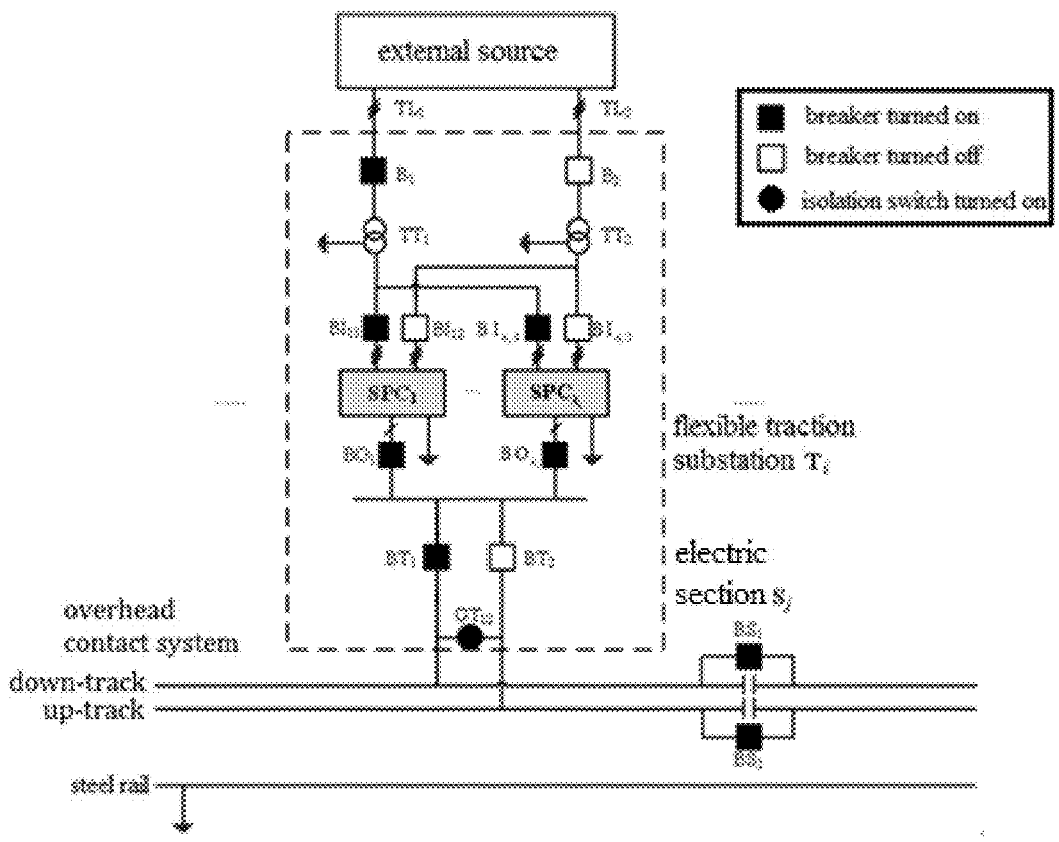
FIG. 8 is a schematic diagram illustrating an operation mode of a single feeder line with up-track and down-track lines according to an embodiment of the present disclosure.

As illustrated in FIG. 8, an isolation switch $GT_{12}$ may be provided between two feeder lines coupled with the flexible traction substation bus and the overhead contact system in the flexible traction substation. In case of a fault of an up-to-net breaker of the flexible traction substation, the flexible traction substation may adopt a mode of single feeder line with up-track and down-track lines, and the isolation switch $GT_{12}$ is turned on, as illustrated in FIG. 8.

Figure 9:
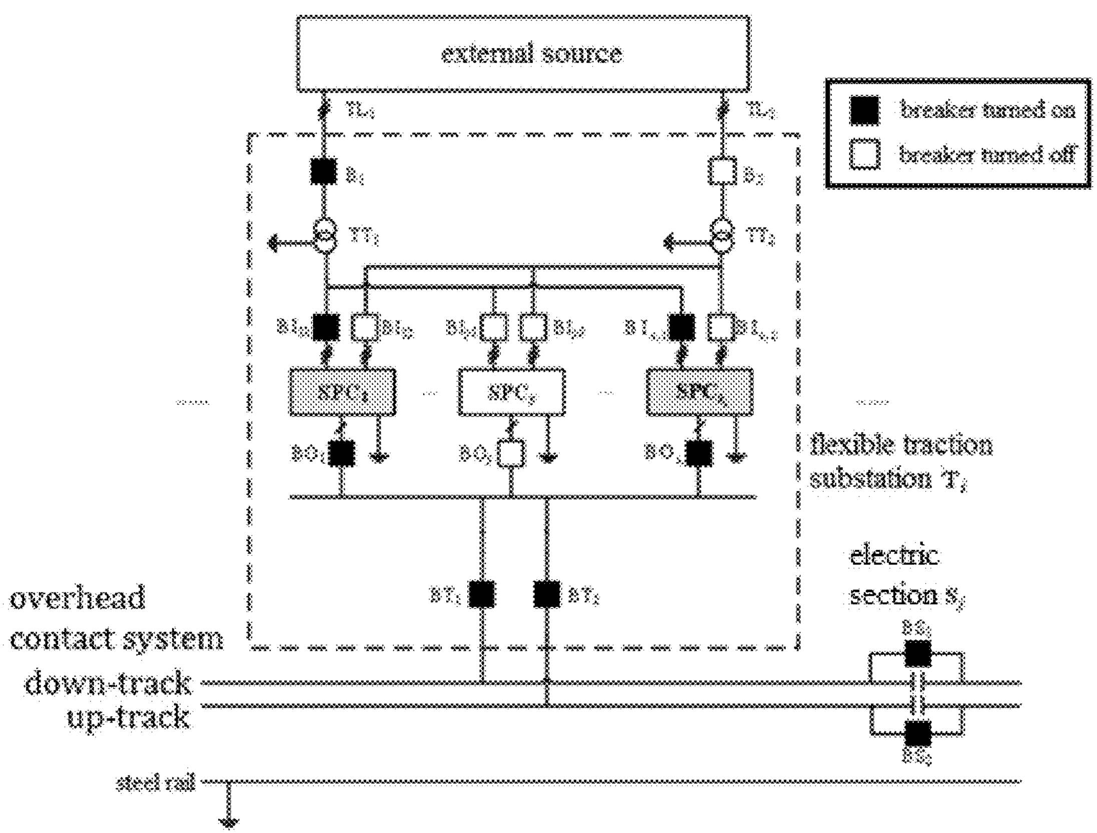
FIG. 9 is a schematic diagram illustrating a system operation mode in case of a fault of a SPC according to an embodiment of the present disclosure.

Further, in an embodiment of the present disclosure, in cause of a fault of any SPC, the fault SPC is out of operation, and breakers on inlet and outlet lines of the fault SPC are turned off. As illustrated in FIG. 9, taking the traction transformers being in the active and standby operation mode as an example, when a y-th SPC of the flexible traction substation $T_i$ is in fault, the $SPC_y$ may be out of operation and the breakers $BI_{y1}$, $BI_{y2}$ and $BO_y$ on the inlet and outlet lines of the $SPC_y$ may be turned off.

It can be understood that in case of a fault of one SPC, the SPC may be out of operation and breakers on inlet and outlet lines of the SPC are turn off, and other SPC in the flexible traction substation operates normally. In a case that there are z ($1 \le z \le k_i$) SPCs in the i-th flexible traction substation out of operation, the flexible traction substation does not split, and the z SPCs are out of operation and breakers on inlet and outlet lines of the z SPCs are turned off, and other SPC in the flexible traction substation operates normally.

Further, in an embodiment of the present disclosure, the breaker in parallel with the electric section is coupled in parallel with an isolation switch. In a case that the breaker in parallel with the electric section refuses to be turned on, the isolation switch is turned on.

It can be understood that the breaker in parallel with the electric section may be coupled in parallel with the isolation switch. In the case that the breaker in parallel with the electric section refuses to be turned on, turning on the isolation switch may improve reliability of the system.

Figure 10:
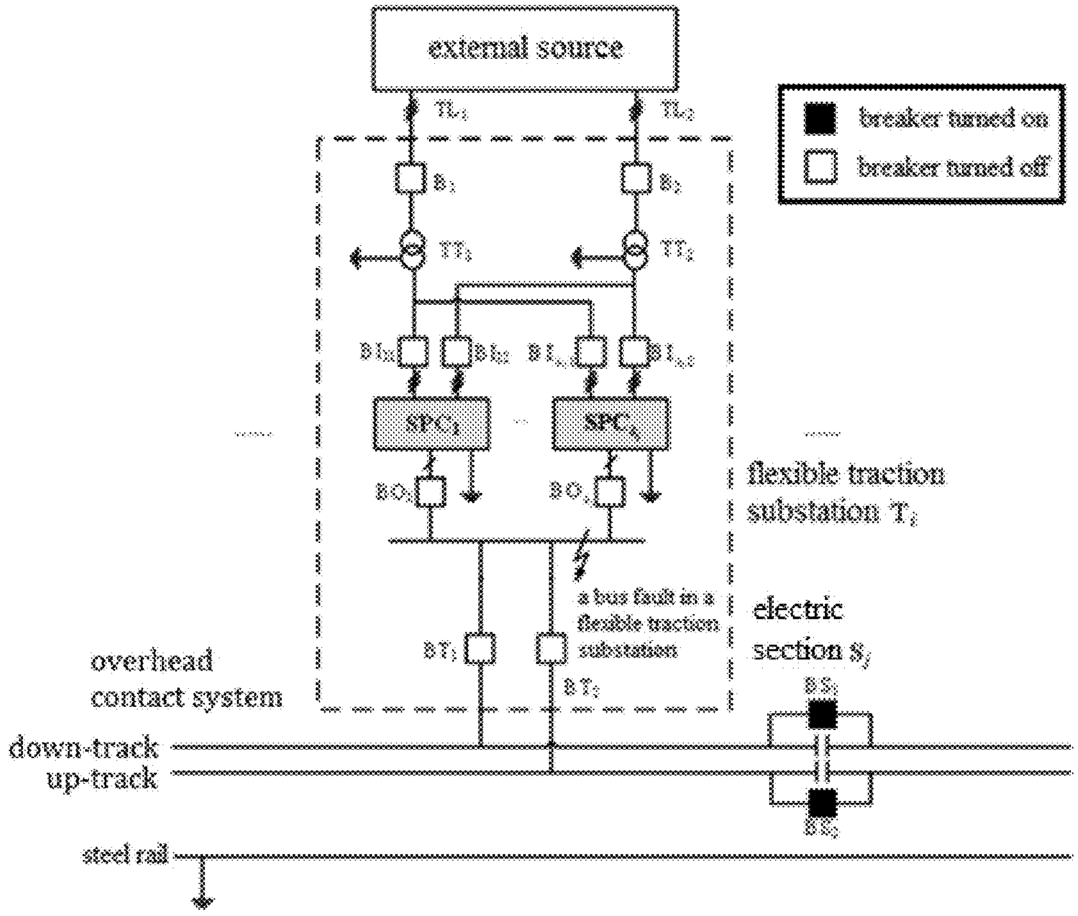
FIG. 10 is a schematic diagram illustrating a system operation mode in case of a bus fault in a flexible traction substation according to an embodiment of the present disclosure.

In response to a bus fault of the flexible traction substation, the flexible traction substation splits, and all breakers $B_1$ and $B_2$ on the power inlet lines, up-to-net breakers $BT_1$ and $BT_2$ on the feeder lines, breakers $BI_{y1}$, $BI_{y2}$, $BO_y$ ($y=1,2,3 \ldots, k_i$) on an input side and an output side of the SPC are turned off, as illustrated in FIG. 10.

Figure 11:
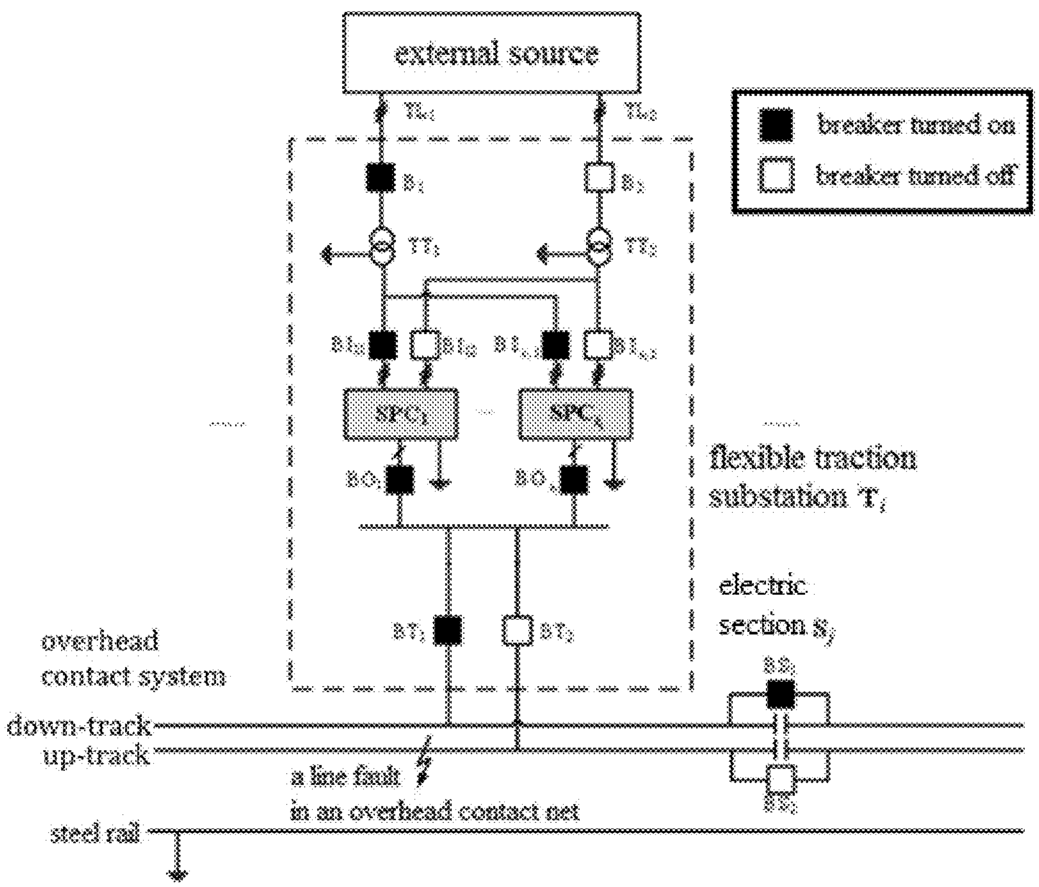
FIG. 11 is a schematic diagram illustrating a system operation mode in case of a line fault in an overhead contact system according to an embodiment of the present disclosure.

In response to a line fault of the overhead contact system, the breakers BS in parallel with all electric sections coupled to a fault point of the lines and the up-to-net breakers BT of the feeder lines of the flexible traction substation are turned off, to isolate the fault, as illustrated in FIG. 11.

Since the SPC may flexibly adjust and control an amplitude, a phase, a frequency and an output power of an output voltage, the system for implementing continuous co-phase flexible alternating current traction power supply proposed according to an embodiment of the present disclosure may be applied to power supply scenarios of traction power supply systems with different voltage levels and different frequencies.

The system for implementing continuous co-phase flexible alternating current traction power supply according to an embodiment of the present disclosure has been simulated and proved that a result is consistent with an expectation. The flexible traction substation adopts a common three-phase transformer with better economy and more mature technology. Under consideration of economy, a strong reliable and flexible main wiring is designed, which may provide a technical solution for a practical project of applying the continuous co-phase power supply technology in the future.

According to the operation mode of the system for implementing continuous co-phase flexible alternating current traction power supply proposed according to an embodiment of the present disclosure, the system for implementing continuous co-phase flexible alternating current traction power supply proposed in the present disclosure may convert three-phase alternating current into single-phase alternating current and supply the single-phase AC power to the bus of the flexible traction substation.

Therefore, the operation mode of the system for implementing continuous co-phase flexible alternating current traction power supply with high reliability may realize power supply on the basis of better economy, greater flexibility, and better applicability and practicability.

An embodiment of the present disclosure provides a system for implementing continuous co-phase flexible alternating current traction power supply. The system includes:

at least one flexible traction substation and electric sections;

each flexible traction substation comprises a first power inlet line and a second power inlet line, each of which is coupled to one end of a corresponding power inlet line breaker, the other end of the corresponding power inlet line breaker is coupled to a primary side of one set of traction transformer, and a secondary side of the traction transformer is coupled to a plurality of SPCs, wherein the SPCs corresponding to each set of traction transformer are coupled in parallel with each other to convert three-phase alternating current into single-phase alternating current and are respectively coupled to a bus of the flexible traction substation through outlet line breakers;

one feeder line is provided between the bus of the flexible traction substation and each of an up-track line and a down-track line of an overhead contact system, and each feeder line is provided with one up-to-net breaker thereon;

the up-track line and the down-track line of the overhead contact system are respectively provided with the electric sections therein, and each of the electric sections is coupled in parallel with one breaker which is turned on in a normal operation mode;

a configuration manner of the electric sections comprises arranging one section post between every two adjacent flexible traction substations, and arranging the electric sections inside the section post; or arranging the electric sections inside the flexible traction substation without arranging any section post, and arranging the electric sections on a same side of two feeder lines between the bus of the flexible traction substation and the overhead contact system, or respectively on both sides of the two feeder lines, or between the two feeder lines;

in which, a number of the electric sections between any two flexible traction substations is determined according to a target project.

The system for implementing continuous co-phase flexible alternating current traction power supply of an embodiment of the present disclosure may render an output voltage and a power of the flexible traction substation flexibly controllable, and may be applied to traction power supply systems with various voltage levels and frequencies, realize the whole line of the overhead contact system to be continuous, cancel all electric sections, effectively improve power quality of an external source and the overhead contact system. Under consideration of economy, a strong reliable and flexible main wiring is designed, which may provide a technical solution for a practical project of applying the continuous co-phase power supply technology in the future.

In addition, the system for implementing continuous co-phase flexible alternating current traction power supply according to an embodiment of the present disclosure have the following additional technical features.

Further, in an embodiment of the present disclosure, each flexible traction substation includes the plurality of SPCs, and each of the SPCs is configured with two input ports, the two input ports are respectively couple to secondary sides of two sets of traction transformers in the flexible traction substation; each of the SPCs has two output ports, one of the two output ports is grounded and the other one of the two output ports is coupled in parallel with one another and is coupled to the bus of the flexible traction substation; in which a grounding mode of the traction transformers is determined according to the SPCs.

Further, in an embodiment of the present disclosure, two sets of traction transformers in any one flexible traction substation are in an active and standby operation mode or a parallel operation mode, in the active and standby operation mode, all of the SPCs are coupled to one set of traction transformer; in the parallel operation mode, two sets of traction transformers operate simultaneously, and the SPCs are coupled to two sets of traction transformers.

Further, in an embodiment of the present disclosure, each flexible traction substation is configured with two up-to-net breakers, and the two up-to-net breakers are respectively coupled the bus of the flexible traction substation with the up-track line and the down-track line of the overhead contact system, the up-track line and the down-track line of the overhead contact system are respectively provided with the electric sections therein, and each of the electrical sections is coupled in parallel with one the breaker which is turned on in a normal operation mode.

Further, in an embodiment of the present disclosure, in case of a fault of one up-to-net breaker, an isolation switch coupled across the up-to-net breakers is turned on, and a single feeder line supplies power to the up-track line and the down-track line.

Further, in an embodiment of the present disclosure, in response to a fault of one power inlet line or one traction transformer, a breaker on the fault power inlet line or breakers on inlet and outlet lines of the fault traction transformer is turned off, and all non-fault SPCs continue to operate through a non-fault power inlet line and a non-fault traction transformer.

Further, in an embodiment of the present disclosure, in response to a fault of any SPC, the fault SPC is out of operation, and breakers on inlet and outlet lines of the fault SPC are turned off.

Further, in an embodiment of the present disclosure, in response to a fault of two power inlet lines or two traction transformers or the bus of the flexible traction substation, the flexible traction substation is out of operation, and other non-fault flexible traction substations supply power to the overhead contact system.

Further, in an embodiment of the present disclosure, in response to a fault of one breaker in parallel with the electric section, an isolation switch in parallel with the electric section is turned on to supply power to two sections of lines coupled through the electric section.

To achieve the above objective, an embodiment of the present disclosure provides a system for implementing continuous co-phase flexible alternating current traction power supply. Based on the system for implementing continuous co-phase flexible alternating current traction power supply according to the first aspect of embodiments of the present disclosure, three-phase alternating current is converted into single-phase alternating current, and the single-phase alternating current is supplied to a bus of a flexible traction substation.

The present disclosure includes the following beneficial effects.

The system for implementing continuous co-phase flexible alternating current traction power supply of an embodiment of the present disclosure may render an output voltage and a power of the flexible traction substation flexibly controllable, and may be applied to traction power supply systems with various voltage levels and frequencies, realize the whole line of the overhead contact system to be continuous, cancel all neutral sections, realize three-phase symmetry of an external source, and effectively improve power quality of the external source and the overhead contact system. The present disclosure may provide the specific wiring mode of the continuous co-phase traction power supply system, and provide a technical solution for an electrified railway project that will build the continuous co-phase traction power supply system. The present disclosure has an ability of system level coordination control, which may organize respective flexible traction substations to operate coordinately through the continuous overhead contact system, and coordinate power outputs of respective flexible traction substations through system level control, in case of the fault of the flexible traction substation, such that a flexible traction substation operated normally may support the flexible traction substation with a fault traction transformer, and improve reliability of power supply for the system. The system may also realize isolation of public power grid and the overhead contact system, and has a fault ride-through capability, and has a small influence range of a power failure switching operation in case of a fault of the system and has strong reliability of power supply. The parallel operation of two sets of traction transformers in each flexible traction substation may make full use of a capacity of each traction transformer, reduce a standby capacity of each traction transformer, and improve economy of the system. In case of the fault of one set of traction transformer in the flexible traction substation, the other set of traction transformer may operate normally and the external source may maintain three-phase symmetry. In case of the fault of one or more SPCs of the flexible traction substation, a normal operation of the flexible traction substation will not be affected. The overhead contact system in the system is provided with electric sections, which may realize fault zoning and isolation of the overhead contact system and effectively limit an influence range of the overhead contact system fault.

In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present disclosure, "a plurality of" means at least two, for example, two or three, unless specified otherwise.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. Thus, schematic representations of the above terms are not necessarily referring to the same embodiment or example. Furthermore, the particular features, structures, materials, or characteristics may be combined in any suitable manner in one or more embodiments or examples. In addition, without contradiction, different embodiments or examples and the features of the different embodiments or examples described in this specification can be combined and assorted by those skilled in the art.

Although explanatory embodiments have been shown and described, it would be appreciated by those skilled in the art that the above embodiments are exemplary and cannot be construed to limit the present disclosure, and changes, revisions, alternatives, and modifications can be made in the embodiments within scope of the present disclosure.

What is claimed is:

1. A system for implementing continuous co-phase flexible alternating current traction power supply, comprising at least one flexible traction substation and electric sections, wherein:

each flexible traction substation comprises a first power inlet line and a second power inlet line, each of which is coupled to one end of a corresponding power inlet line breaker, the other end of the corresponding power inlet line breaker is coupled to a primary side of one set of traction transformer, and a secondary side of the one set of traction transformer is coupled to a plurality of static power converters (SPCs) via a plurality of breakers, respectively, wherein the SPCs corresponding to each set of traction transformer are coupled in parallel with each other to convert three-phase alternating current into single-phase alternating current and are respectively coupled to a bus of the flexible traction substation through outlet line breakers, wherein the SPCs are configured to adjust and control output power;

one feeder line is provided between the bus of the flexible traction substation and each of an up-track line and a down-track line of an overhead contact system, and each feeder line is provided with one up-to-net breaker thereon;

the up-track line and the down-track line of the overhead contact system are respectively provided with the electric sections therein, and each of the electric sections is coupled in parallel with one breaker which is turned on in a normal operation mode;

a configuration manner of the electric sections comprises arranging one section post between every two adjacent flexible traction substations, and arranging the electric sections inside the section post; or arranging the electric sections inside the flexible traction substation without arranging any section post, and arranging the electric sections on a same side of two feeder lines between the bus of the flexible traction substation and the overhead contact system, or respectively on both sides of the two feeder lines, or between the two feeder lines;

wherein an operation mode of two sets of traction transformers in any one flexible traction substation comprises a parallel operation mode, in the parallel operation mode, the two sets of traction transformers operate simultaneously, and each of the SPCs is coupled to the two sets of traction transformers, in case of a fault of one set of traction transformer or a fault of an inlet line of one set of traction transformer, power outputs of respective flexible traction substations are coordinated, to support a flexible traction substation associated with a traction transformer with the fault using a flexible traction substation operated normally.

2. The system according to claim 1, wherein, each flexible traction substation comprises the plurality of SPCs, and each of the SPCs is configured with two input ports, the two input ports are respectively couple to secondary sides of two sets of traction transformers in the flexible traction substation; each of the SPCs has two output ports, one of the two output ports is grounded and the other one of the two output ports is coupled in parallel with one another and is coupled to the bus of the flexible traction substation; wherein a grounding mode of the traction transformers is determined according to the SPCs.

3. The system according to claim 1, wherein the operation mode of the two sets of traction transformers in any one flexible traction substation further comprises an active and standby operation mode, in the active and standby operation mode, all of the SPCs are coupled to one set of traction transformer.

4. The system according to claim 1, wherein, each flexible traction substation is configured with two up-to-net breakers, and the two up-to-net breakers are respectively coupled the bus of the flexible traction substation with the up-track line and the down-track line of the overhead contact system, the up-track line and the down-track line of the overhead contact system are respectively provided with the electric sections therein, and each of the electrical sections is coupled in parallel with one breaker which is turned on in a normal operation mode.

5. The system according to claim 4, wherein, in case of a fault of one up-to-net breaker, an isolation switch coupled across the up-to-net breakers is turned on, and a single feeder line supplies power to the up-track line and the down-track line at the same time.

6. The system according to claim 1, wherein, in response to a fault of one power inlet line or one set of traction transformer, a breaker on the fault power inlet line or breakers on inlet and outlet lines of the fault traction transformer is turned off, and all non-fault SPCs continue to operate through a non-fault power inlet line and a non-fault traction transformer.

7. The system according to claim 1, wherein, in response to a fault of any SPC, the fault SPC is out of operation, and breakers on inlet and outlet lines of the fault SPC are turned off.

8. The system according to claim 1, wherein, in response to a fault of two power inlet lines or two sets of traction transformers or the bus of the flexible traction substation, the flexible traction substation is out of operation, and other non-fault flexible traction substations supply power to the overhead contact system.

9. The system according to claim 1, wherein, in response to a fault of one breaker in parallel with the electric section, an isolation switch in parallel with the electric section is turned on to supply power to two sections of lines coupled through the electric section.

10. The system according to claim 1, wherein a number of the electric sections between any two flexible traction substations is determined according to a target project.

11. An operation mode of a system for implementing continuous co-phase flexible alternating current traction power supply, comprising:

based on the system for implementing continuous co-phase flexible alternating current traction power supply, converting three-phase alternating current into single-phase alternating current, and supplying the single-phase alternating current to a bus of a flexible traction substation;

system for implementing continuous co-phase flexible alternating current traction power supply, comprising at least one flexible traction substation and electric sections, wherein:

each flexible traction substation comprises a first power inlet line and a second power inlet line, each of which is coupled to one end of a corresponding power inlet line breaker, the other end of the corresponding power inlet line breaker is coupled to a primary side of one set of traction transformer, and a secondary side of the one set of traction transformer is coupled to a plurality of static power converters (SPCs) via a plurality of breakers, respectively, wherein the SPCs corresponding to each set of traction transformer are coupled in parallel with each other to convert three-phase alternating current into single-phase alternating current and are respectively coupled to a bus of the flexible traction substation through outlet line breakers, wherein the SPCs are configured to adjust and control output power;

one feeder line is provided between the bus of the flexible traction substation and each of an up-track line and a down-track line of an overhead contact system, and each feeder line is provided with one up-to-net breaker thereon;

the up-track line and the down-track line of the overhead contact system are respectively provided with the electric sections therein, and each of the electric sections is coupled in parallel with one breaker which is turned on in a normal operation mode; and a configuration manner of the electric sections comprises arranging one section post between every two adjacent flexible traction substations, and arranging the electric sections inside the section post; or arranging the electric sections inside the flexible traction substation without arranging any section post, and arranging the electric sections on a same side of two feeder lines between the bus of the flexible traction substation and the overhead contact system, or respectively on both sides of the two feeder lines, or between the two feeder lines;

wherein an operation mode of two sets of traction transformers in any one flexible traction substation comprises a parallel operation mode, in the parallel operation mode, the two sets of traction transformers operate simultaneously, and each of the SPCs is coupled to the two sets of traction transformers, in case of a fault of one set of traction transformer or a fault of an inlet line of one set of traction transformer, power outputs of respective flexible traction substations are coordinated, to support a flexible traction substation associated with a traction transformer with the fault using a flexible traction substation operated normally.

12. The operation mode according to claim 11, wherein, each flexible traction substation comprises the plurality of SPCs, and each of the SPCs is configured with two input ports, the two input ports are respectively couple to secondary sides of two sets of traction transformers in the flexible traction substation; each of the SPCs has two output ports, one of the two output ports is grounded and the other one of the two output ports is coupled in parallel with one another and is coupled to the bus of the flexible traction substation; wherein a grounding mode of the traction transformers is determined according to the SPCs.

13. The operation mode according to claim 11, wherein the operation mode of the two sets of traction transformers in any one flexible traction substation further comprises an active and standby operation mode, in the active and standby operation mode, all of the SPCs are coupled to one set of traction transformer.

14. The operation mode according to claim 11, wherein, each flexible traction substation is configured with two up-to-net breakers, and the two up-to-net breakers are respectively coupled the bus of the flexible traction substation with the up-track line and the down-track line of the overhead contact system, the up-track line and the down-track line of the overhead contact system are respectively provided with the electric sections therein, and each of the electrical sections is coupled in parallel with one breaker which is turned on in a normal operation mode.

15. The operation mode according to claim 14, further comprising:

in case of a fault of one up-to-net breaker, turning on an isolation switch coupled across the up-to-net breakers, supplying power to the up-track line and the down-track line at the same time by a single feeder line.

16. The operation mode according to claim 11, further comprising:

in response to a fault of one power inlet line or one set of traction transformer, turning off a breaker on the fault power inlet line or breakers on inlet and outlet lines of the fault traction transformer, and continuing to operate all non-fault SPCs through a non-fault power inlet line and a non-fault traction transformer.

17. The operation mode according to claim 11, further comprising:

in response to a fault of any SPC, the fault SPC being out of operation, and turning off breakers on inlet and outlet lines of the fault SPC.

18. The operation mode according to claim 11, further comprising:

in response to a fault of two power inlet lines or two sets of traction transformers or the bus of the flexible traction substation, the flexible traction substation being out of operation, and supplying power to the overhead contact system by other non-fault flexible traction substations.

19. The operation mode according to claim 11, further comprising:

in response to a fault of one breaker in parallel with the electric section, turning on an isolation switch in parallel with the electric section to supply power to two sections of lines coupled through the electric section.

20. The operation mode according to claim 11, wherein a number of the electric sections between any two flexible traction substations is determined according to a target project.

* * * * *